Sept. 23, 1947.   J. F. HAINES ET AL   2,427,779
HYDRAULIC REGULATOR MECHANISM
Filed Oct. 12, 1942   2 Sheets-Sheet 1
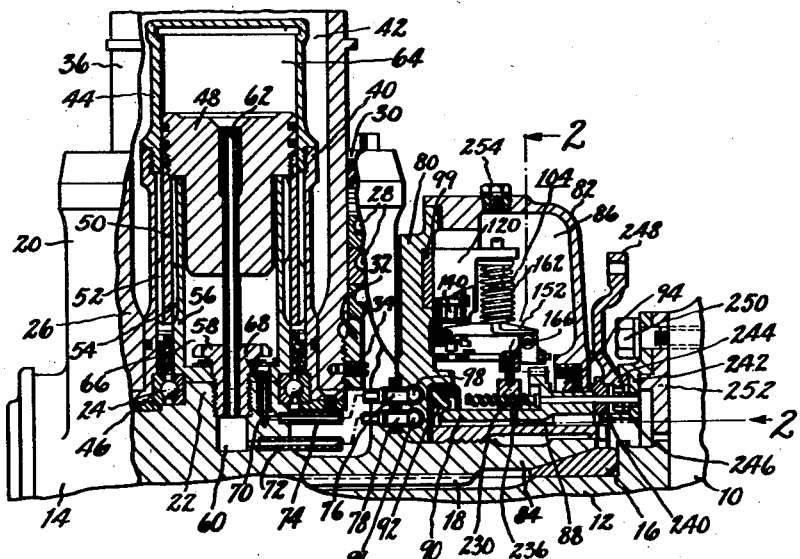
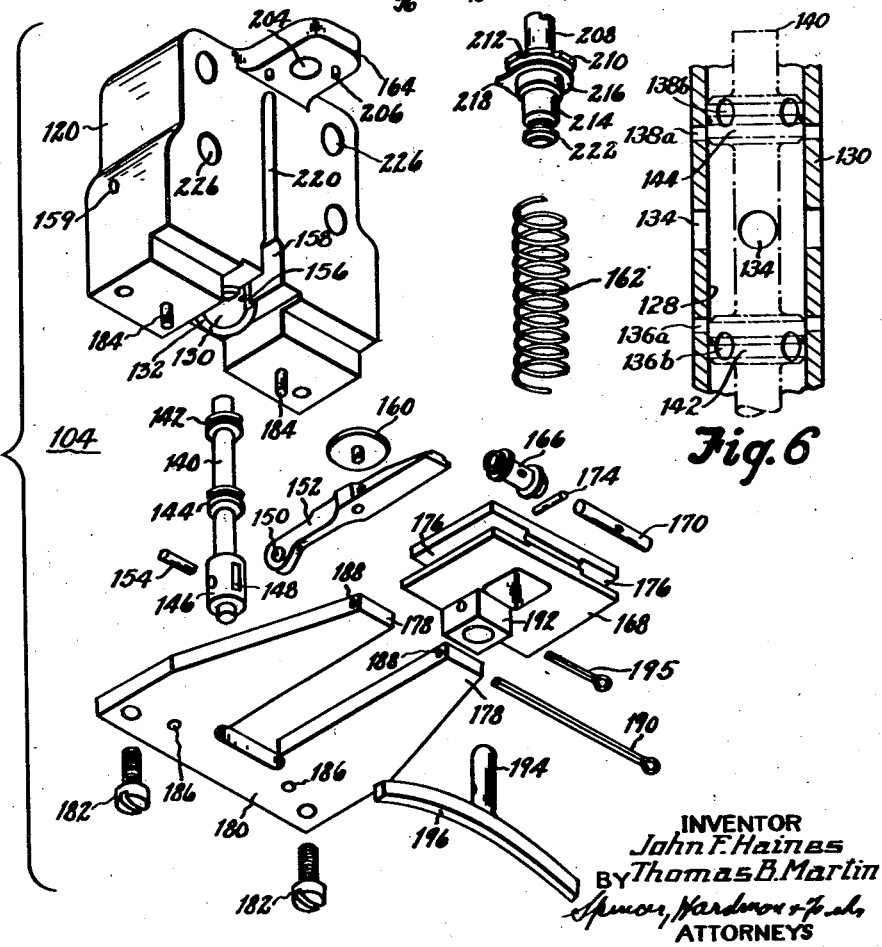
INVENTOR
John F. Haines
BY Thomas B. Martin
ATTORNEYS

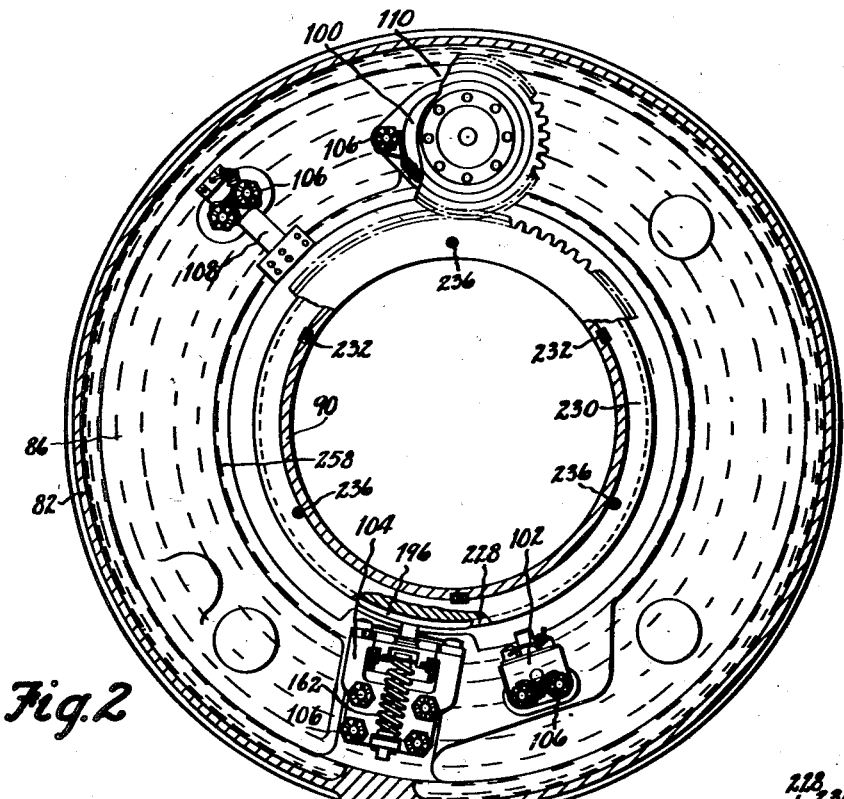
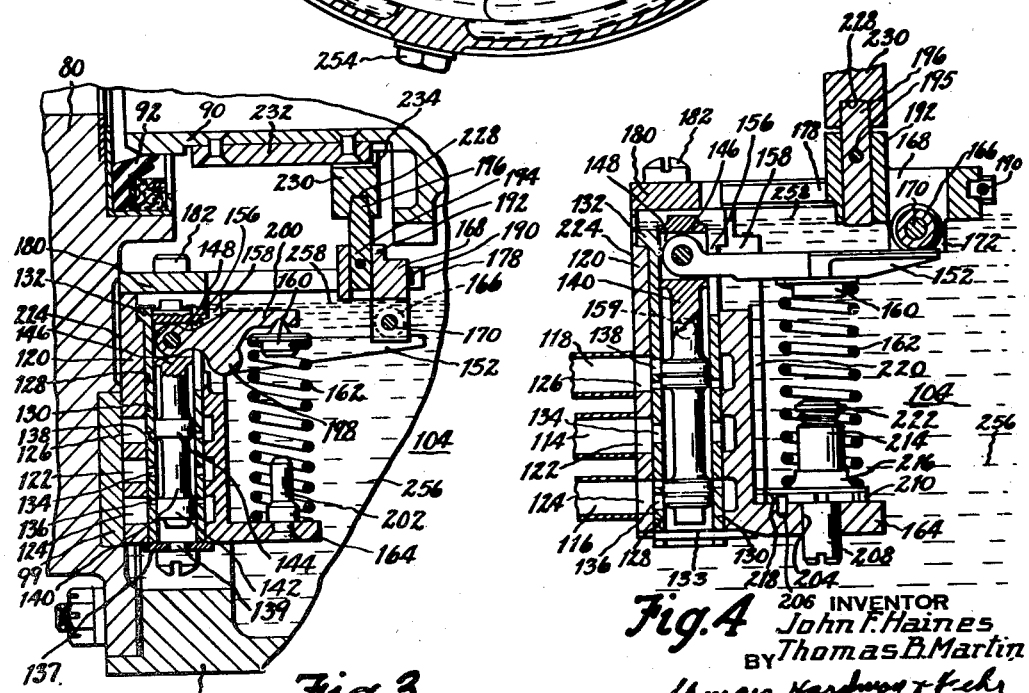

Patented Sept. 23, 1947

2,427,779

UNITED STATES PATENT OFFICE 2,427,779

HYDRAULIC REGULATOR MECHANISM

John F. Haines and Thomas B. Martin, Dayton, Ohio, assignors to General Motors Corporation, Detroit, Mich., a corporation of Delaware Application October 12, 1942, Serial No. 461,687

5 Claims. (Cl. 137—140)

This invention relates to aircraft propellers of the controllable pitch type and particularly to governor valve units for fluid pressure control systems.

An object of the invention is to provide a governor valve unit as a simple self contained assembly, adaptable for subcontracting construction, and of universal application to a plurality of propeller constructions.

A further object is to provide a governor valve construction susceptible of mounting on a rotating regulator mechanism and at the same time making fluid connection into the control circuit without the aid of connecting pipes or tubing.

Another object of the invention is to provide a governor valve mechanism that is adapted to be mounted on a rotatable part and be continuously adjustable for selecting the speed level of control even while the valve mechanism and its support are under a state of rotation.

Another object of the invention is to provide a governor valve mechanism that has a valve plunger and lever acting as flyball elements of a governor, thus reducing to a minimum the parts of the unit.

Another object of the invention is to provide a governor valve mechanism in which the valve plunger is radially disposed with respect to the axis of unit rotation and is responsive to the speeds of rotation for effecting the controlling function.

Yet another object of the invention is to provide a governor valve unit incorporating a valve plunger and porting sleeve the relative position of which bears a definite relationship to offspeed.

Another object is to provide a governor valve unit in which the valve movement is parallel to the direction of all opposing and actuating forces directed to the valve.

Another object is to provide a governor valve unit in which the valve movement is coincident with the direction of application of centrifugal actuating force.

Still another object is to provide a governor valve unit in which a valve member is movable in response to the domination of a working force or an opposing force applied in parallelism with the valve movement to a lever for actuating the valve, and in which the mechanical advantage of the opposing forces may be selectively altered for predetermining the response of the valve member to either of the dominating forces.

Further objects and advantages of the present invention will be apparent from the following description, reference being had to the accompanying drawings wherein a preferred embodiment of the present invention is clearly shown.

In the drawings:

Fig. 1 is a radial section through the propeller hub and pitch control mechanism involving the instant invention.

Fig. 2 is a transverse sectional view through the regulator mechanism and showing certain of the elements of the control mechanism in elevation, being a view substantially as indicated by the line and arrows 2—2 of Fig. 1.

Fig. 3 is a sectional view through one form of a governor valve mechanism.

Fig. 4 is a sectional view through a preferred form of governor valve mechanism.

Fig. 5 is an exploded view of the preferred form of valve mechanism, showing the individual parts in detail and their approximate relations with one other.

Fig. 6 is an enlarged view of the porting sleeve of the governor valve showing certain features of the invention.

With particular reference to the drawings, let the numeral 10 indicate the engine housing from which projects a rotatable propeller shaft 12, on which is mounted in the usual or convenient manner a propeller hub 14. Aside from the cone seat 16 and the usual hub nut, the driving connection between the shaft 12 and the hub 14 may be effected by a spline connection as indicated at 18, so that rotation of the shaft 12 will insure rotation of the hub 14. The hub 14 has radiating therefrom a plurality of sockets 20 that are bottomed by a hub boss 22 adapted to support a ball bearing 24 journalling the inner end of the blade root 26, and a stack of ball bearings 28 in cooperation with a blade retaining nut 30 in the outer end of the socket 20 taking the thrust of the blade. A blade nut 32 locked against rotation on the blade root 26 by means of a pin or stud 34 transmits the centrifugal load from the blade 36 to the stack bearings, though the latter permit relatively frictionless rotation of the blade with respect to the hub 14 for the blade pitch changing.

The blade pitch change is effected by a torque applying unit 40 mounted within a bore 42 of the blade root 26, the unit including a cylinder 44 maintained in driving relation with the blade root 26 in any desired manner and supporting a gear sector 46 meshing with a coordinating gear, not shown, which in turn meshes with every other gear sector of the same hub. Movable along the length of the cylinder is a piston member 48 having a skirt portion 50 with outward and inward spiral spline engagements 52 and 54 with the inside of the cylinder and the outside respectively of a tubular spindle 56 rigidly supported from the hub boss 22. The spindle 56 is retained in nonrotative relation by a tubular cap screw 58 passing through the base of the spindle and threading into the hub boss 22 where it communicates with a chamber 60 in the boss that aids in transmitting fluid to and from one side of the piston 48. To further assist in that transmission the cap screw 58 retains a tube 62 that extends along the length of the cylinder 44 in slidable engagement with the piston 48 so as to open outwardly into a chamber 64 on the outboard end of the piston 48. Fluid communication to the inboard end of the piston, or chamber 66, is made through a tubular dowel 68 passing through the bottom of the spindle 56 and opening into a drill or other passage 70. Transfer tubes 72 and 74 lead from the chamber 60 and the passage 70 respectively to connectors 76 and 78 respectively from which point fluid connection is made with appropriate regulator mechanism.

The regulator mechanism is housed within a reservoir made up of an annular plate 80 and a cover member 82 secured together and mounted centrally over a rear tubular or sleeve like extension 84 of the hub 14 thereby forming an annular chamber 86 surrounding and substantially concentric with the propeller shaft. The housing is retained on the hub extension in driving relation by a sleeve nut 88, and its inner periphery is closed by an adapter sleeve 90 supported against rotation from the engine casing 10 as will be presently described. Bearing seals 92 and 94 carried by the plate 80 and the cover 82 respectively engage the adapter sleeve 90 while at rest and during low speed rotation to prevent loss of fluid medium from the reservoir 86, but are adapted to lift off under higher speeds of rotation to reduce wear of the seals and to permit breathing of the reservoir 86 to outside air when the mechanism is rotating. Assembly of the regulator plate 80 upon the hub structure automatically makes connection between the control units and the torque applying units, since seating of the plate 80 on the hub extension 84 aligns the fluid connectors 76 and 78 with control passages 96 and 98, both of which are cast into the plate 80 as inserts and serve to connect the control units in the proper fluid circuit relation. It is to be understood that the units of the control mechanism are mounted on the plate in juxtaposition to designated points of the plate so that merely machining or drilling of the plate body will make accessible fluid connection with the units. A pad 99 facilitates the juncture of the control passages and may provide the drilled orifices by the control units.

The control mechanism may consist of such units as a pump 100, a pressure relief valve 102, and a governor or distributor valve mechanism 104, each of which is mounted on the plate 80 by means of screw devices 106, and which may be connected into the fluid circuit somewhat as suggested in Fig. 6. Also mounted on the plate 80, and perhaps the cover member 82 there may be a breather valve assembly 108, or similar devices, the inclusion or exclusion of which forms no part of this invention. The pump 100 as disclosed herein is of the constant delivery type, that is, one capable of delivering a stream of fluid medium so long as the propeller is rotating, and has an intake 110 near the periphery of the reservoir and delivers fluid under pressure to a supply passage 112 that leads to the pressure relief valve 102 and thence to a supply port 114 of the governor valve unit. Other ports 116 and 118 outboard and inboard of the pressure supply port 114 connect with the control passages 96 and 98 and the transfer tubes 72 and 74 respectively. Thus the pump, or pressure developing means as it may be termed, creates a supply of fluid under pressure and delivers it to the governor valve where it is distributed to one side or the other of the torque applying unit whereby change of blade pitch is effected in accordance with the characteristics of the control valve. In other words, the governor valve mechanism is the vital part of the control mechanism, since the effectiveness of the blade pitch change depends upon the fidelity of the governor valve to administer the control function. A governor valve to be efficient should be sensitive to the slightest call for corrective function, though it should not be so unstable as to introduce serious hunting of the valve member in administering the control function.

In building those features into the governor valve mechanism of the present invention, applicants provide a valve body 120 housing the valve member and supporting associated elements of structure so that the unit may be manufactured as a single unit of structure, and when completed is susceptible of mounting on the regulator plate 80 by means of the screw devices 106. Thus the valve assembly becomes interchangeable with other valve assemblies and is adapted for mounting on other regulator plates. When so mounted the assembly automatically makes connection into the fluid circuit of the plate, since the body 120 provides ported recesses 122, 124 and 126 adapted to align with the ports 114, 116 and 118 respectively. Passing lengthwise of the body 120, so as to open into all of the recesses 122, 124 and 126 there is a bore 128 in which is press fitted or otherwise secured an open ended tubular liner or porting sleeve 130 which has a flange 132 engaging one end of the body 120 to keep it from movement along the bore of the body under centrifugal force of propeller rotation. A pin 133 may be passed through the other end of the sleeve for keeping it in place, yet permitting fluid flow out of either end of the sleeve into the reservoir 86. When so positioned the porting sleeve 130 disposes sets of ports 134, 136 and 138 in registry with the recesses 122, 124 and 126 respectively of the body, and the bore of the porting sleeve slidably receives a valve plunger or rod 140 for switching the fluid pressure from port 134 to either 136 or 138. The plunger 140 is of cylindrical form and has two lands 142 and 144 spaced axially so as to normally cover the sets of ports 136 and 138 respectively when the plunger is in the middle or equilibrium position substantially as shown in Figs. 3 and 4.

Details of the porting arrangement for the sleeve and valve plunger are shown in Fig. 6 where each of the groups 136 and 138 are made up of a ring of small holes 136a and 138a and an associated ring of larger holes 136b and 138b. Each group of holes are so dimensioned and located with respect to the length of the corresponding lands 142 and 144 that a portion of each will be exposed to the bore of the tube while the valve plunger is in the equilibrium position. The relation of the valve plunger is shown in phantom and it will be noted that the pressure applying holes 136a and 138a are nearest to the pressure supply ports 134 while the larger pressure relief ports 136b and 138b are more remote. In the equilibrium position both sets of the control ports are partially open to the pressure from port 122 through a very small area of the ports thus placing both sides of all torque applying units under the urge of pressure. At the same time the holes 136b and 138b have a considerably smaller area, if any, opening to relief of that pressure thus permitting a very small amount of flow from 134 through 136a, and 138a into 124 and 126, and then out through 136b and 138b. Hence, the pressure being equal on both sides of the pistons of the torque applying units and both sides being only partially relieved to the reservoir, there will be no resulting movement of the torque applying units, but there will be a slight flow of pressure medium through the ports that keeps the valve parts freely lubricated against static friction and makes it more responsive to slight shifting forces. When an impulse is applied to shift the valve plunger 140 the pressure applying port 136a or 138a will open to a lesser extent than the pressure relieving port 138b or 136b of the other group. To that extent the plunger and sleeve provide a four-way valve.

From the land 144 the plunger extends to a cylindrical enlargement 146 of substantially the same diameter as the bore of the porting sleeve, and the enlargement is provided with a diametric slot 148 for reception of the eyeleted end 150 of an arm or lever 152 where it is pivotally retained by a cross pintle 154. The lever 152 is arranged transverse to the porting sleeve and block and in extending from the pivot connection 154 with the plunger passes through slots 156 and 158 lengthwise of the sleeve and block, and which slots are of a length to extend over the full length of the enlargement 146 irrespective of the position to which it may be adjusted and so that the port 118 may have a return connection to the reservoir 86. The slots may be augmented by bores 159 where desired. At an intermediate point of the lever length a spring seat or pad 160 is provided to receive the thrust of a spring 162 opposing the centrifugal force applied to the movable parts of the valve mechanism, as will presently be described. The spring 162 has a second seat from a lug or arm 164 extending from the body 120 in general parallelism with the lever 152. Extending beyond the spring seat 160 the lever 152 is relatively free in that it rests upon a movable fulcrum roller 166 by reason of the force of the spring 162.

The fulcrum roller is supported by a carriage 168, there being an axle pin 170 anchored in journal bearings afforded by lugs 172 on one side of the carriage, a cross pin 174 removably securing the roller 166 to the axle 170. The carriage is somewhat the form of a block or plate whose opposite edges are grooved at 176 to receive the arms 178 of a way-plate 180 secured to the opposite end of the body 120, by screws 182. For mounting the way-plate the end of the body opposite to the arm 164 is machined smooth and perpendicular to the bore 128, and is provided with a pair of locating dowels 184 receptive by locating holes 186 in the way-plate. When the way-plate is secured to the body 120 the arms 178 extend in parallelism with the lever so as to form guides along which the carriage may slide. In the free ends of the arms 178 there are drill holes 188 for the reception of a cotter or other pin 190 that is inserted to prevent disengagement of the carriage from the ways. When the carriage is mounted on the ways the lugs 172 will be disposed between the ways and the lever 152 and the roller 166 will support the free end of the lever. On the opposite face of the carriage a boss 192 is drilled to receive the stem 194 of a shoe 196 where it is retained by a peg or pin 195 so as to be engageable in a grooved member for shifting the carriage.

The governor valve unit in all its detail is shown in Fig. 5, and in the assembled relation in Figs. 3 and 4. In principle, the structure of Figs. 3 and 4 are the same, but details of fashioning of the parts make for use of a different form of valve lever. In Fig. 3, the lever is of yoke form in that after emerging from the body 120 it branches off from a bridge portion 198 into two free arms 152 extending parallel with the way-plate, and each engage a separate roller 166 supported by the carriage. To one side of the bridge 198 and located between the lever arms there is an offset lug or shelf 200 that is recessed to receive the spring pad 160. That construction places the point of spring thrust upon the lever system as being radially inward of a line passing through the pivot of the lever and the point of fulcrum engagement, while the form of construction shown in Fig. 4 locates the point of spring thrust upon the lever system as being radially outward of the same reference line. In either form of construction, movement of the valve lever 152 over the fulcrum roller 166 tends to change the flexure of the spring 162, which, depending upon the position of the fulcrum roller resists, according to predetermined requirements, the effect of centrifugal forces upon the movable elements of the valve assembly. In Fig. 3 the supporting end of the spring is fixed since it is rested upon the ledge 164 and is positioned by a pin 202 set in the ledge.

In Fig. 4 an installation adjustment of the spring can be made by reason of the adjustable supporting end of the spring, since the ledge 164 provides a plane hole 204 in line with the axis of the spring and has lock pins 206 set to one side thereof substantially as shown in Figs. 4 and 5. The device for locating the spring comprises a stud 208 rotatable and slidable in the hole 204 and having a flange or collar 210 notched at 212 for engaging the ledge after nesting with the lock pins 206. A nut 214 carried by the stud embodies a flange 216 for seating one end of the spring, and the flange has a laterally extending lug or tongue 218 engageable with a longitudinal slot 220 in the adjacent side of the body 120. A lock collar 222 at the end of the threaded portion of the stud prevents displacement of the spring seat from the stud. In making the adjustment, a proper tool is applied to the stud 208 which is depressed so as to disengage the notches 212 from the pins 206. Then the stud may be turned to another notch engaging position. As the stud is turned the nut 214 threads along the screw portion of the stud being restrained from turning with respect to the spring by the engaging portions 218 and 220. That adjustment is a provision that is made available during installation of a propeller unit upon a shaft. It is designed to bring the response of the control mechanism within a range best suited for the particular installation. Once made it is seldom if ever disturbed.

A continuously available and controllable adjustment is also provided and embodies movement of the carriage and fulcrum as has been suggested. The body 120 has a mounting face 224 engageable with the plate 80 where it is secured by screws 106 hereinbefore mentioned threading through holes 226 of the block and into the plate 80. The valve unit is so located and positioned on the plate that the valve plunger 140 is disposed radially of the axis of rotation and so that the lever carrying end is radially inward, and with the lever 152 extending aft substantially parallel with the axis of rotation. The shoe 196 is thus disposed to engage and ride in a groove 228 of a control ring 230, the earlier mentioned grooved member, encircling and movable axially of the adapter sleeve 90. Axially extending keys or feathers 232 located on the adapter sleeve engage notches 234 of the control ring 230 and prevent its rotation relative thereto.

The groove 228 in the periphery of the control ring 230 is purposely not confined to a single plane, but in fact wavers fore and aft of the plane at least once for the circumferential length. Thus, though the control ring is firmly held in same position along the length of the sleeve 90, the contour of the groove 228 will cause the carriage 168 to reciprocate ever so little along the ways 178 during rotation of the regulator. Since the shoe 196 follows the groove 228, then the fulcrum 166 is continually moved back and forth which results in sufficient sustained movement of the valve plunger 140 to eliminate any static friction opposing quick response of the valve when a control function is delivered. That structure is also conducive to sensitive response of the valve to a relatively weak control function.

Movement of the control ring axially of the adapted sleeve 90 is accomplished by means of three high-lead screw shafts 236 threading through the ring as shown in Figs. 1 and 2, and journaled in a flange 238 of the sleeve. A thickened portion of the sleeve abuts a guide ring 240 which with a flange ring 242 forms a channel for keeping of a ring gear 244 adapted to mesh with pinions 246 on the screw shafts and coincidentally drive them for shifting the control ring, upon movement of a lever attached to the eyeleted lug 248. The flange ring 242 provides lugs or ears for reception of hold down screws 250 and is designed to be centered about the pilot ring 252 secured to the engine nose or casing by the same hold down screws.

On reference to the drawings it will be observed that the governor valve mechanism is so mounted on the regulator plate that the bore of the block is situated along a radius of the rotatable regulator and so that the valve plunger 140 is capable of moving radially inward and outward along the bore of the block, at the same time the end of the plunger attached to the lever 152 is radially inward of the wall 82 and of the spring 162. The valve plunger 140 and the attached lever 152 constitute the movable parts of the valve assembly, and are the parts subject to centrifugal force during propeller rotation, and subject to movement by the opposing force of the spring 162. During a condition of rest and during speeds of propeller rotation less than a predetermined rate, the movable valve parts will be cast radially inward toward the axis of rotation due to the dominance of the spring force, but as the speed of rotation increases the spring force which remains substantially constant is gradually overcome by the centrifugal force exerted on the valve plunger and lever. Eventually, the centrifugal force just balances the spring force and then the valve member reaches an equilibrium position. When the movable valve parts are inward of the equilibrium position the pressure supply port 122 will be connected with the control passage 118 through the port 126 while the port 124 and consequently the control passage 116 will be connected back to the reservoir 86 through the port 136 and open end of the porting sleeve 130. If a cover plate is used as at 137 in Fig. 3, it will be apertured as at 139. When the valve plunger reaches the equilibrium position both ports 124 and 126 will be substantially isolated from both the pressure supply port 122 and the reservoir 86.

By reason of predetermined conditions, adjustments and servicing of the propeller mechanism, the reservoir is charged with a quantity of pressure fluid medium that will substantially completely immerse the movable governor parts while the propeller is under a state of rotation. The reservoir is normally proof against leakage of fluid medium while it is at rest, so that it may be charged with the fluid medium through a filler opening in the circular wall of the member 82, which is also used to adjust the valve spring 162, and which opening is closed by a screw plug 254. With the reservoir under rotation the fluid medium 256 will be cast against the outside wall of the reservoir and present an arcuate surface concentric with the shaft 12 somewhat as indicated at 258.

Operation at low fluid levels, unless the unit is adjusted for the lower level, decreases the maximum speed at which the propeller will automatically control.

Thus the distributor valve unit is an integral part of the propeller governor, inasmuch as the valve plunger and lever are also the flyball elements of the governor. The body may consist of an aluminum alloy housing into which is pressfitted a steel cylinder for the porting sleeve. Passages in the housing admit fluid to three sets of holes in the steel cylinder, the center set of holes being exposed to the high pressure line from the pump and having no metering characteristics. Covering the other two sets of holes are two lands of the valve plunger. These holes and lands are designed to have definite metering characteristics which give a proportionalizing characteristic to the governor by causing the valve opening to hold definite relationship to the amount of offspeed. At the outside ends of the two lands, passages communicate from the porting sleeve to the reservoir for return of fluid from the low pressure side of blade pistons. To the valve plunger is attached a lever which extends into the reservoir and has attached to it one end of a compression spring, the other end of which is attached to the body of the assembly. The spring action is resisted by a roller which runs on the lever and is carried on a bronze carriage supported on steel ways.

With the fulcrum set in any normal position as shown, centrifugal force tends to throw the valve plunger outward. This motion is resisted by the spring acting through the lever system plus the buoyancy of the movable parts immersed in the fluid mechanism. At equilibrium speed the moments about the fulcrum roller of the spring force and of centrifugal force acting on the valve plunger are exactly equal and the valve plunger takes a substantially neutral position covering both sets of holes in the porting sleeve. Under these conditions substantially no fluid flows and the pitch of the blades remains constant. An increase of speed above this equilibrium speed will cause the centrifugal moment to be dominant and the valve plunger will move outwardly opening the outer control passage to the high pressure fluid and the inner control passage to the reservoir. In this position, fluid will flow from the pump to the inner side of the piston forcing the blade pistons out and thereby increasing the pitch of the propeller. The increased pitch will cause the engine to slow down and the slowing down of the engine will in turn bring the valve plunger back to its neutral position. Conversely, a drop in speed from the equilibrium speed will open the inner control passage to the high pressure fluid and the outer control passage to the reservoir, causing fluid to flow from the pump to the outer side of the blade pistons, thereby bringing the valve plunger back to the neutral position.

In order to control the equilibrium or governed speed the roller fulcrum may be moved fore and aft, thereby changing the equilibrium speed by changing the ratio of the spring arm to the centrifugal force arm. As the roller fulcrum is moved toward the end of the lever the spring force becomes more effective and more centrifugal force is required to move the valve plunger out to the equilibrium position. This movement is accomplished by moving the roller fulcrum on the carriage so that it may slide on the ways. Attached to this carriage is a shoe or ring sector which rides in the groove of a bronze control ring mounted on the fixed part of the propeller. Axial movement of this ring is obtained by the three highlead screws which are threaded into this bronze ring and extended rearwardly through the fixed member of the regulator to gear pinions. The control lever is part of a large ring gear which engages the three gear pinions so that movement of the control lever rotates all of the pinion and through the high lead screws moves the bronze control ring fore and aft. From this description it can be seen that each position of this control lever corresponds to a definite equilibrium speed, and the relation of the propeller control with the tachometer hand designates the fluid content of the reservoir.

While the embodiment of the present invention as herein disclosed, constitutes a preferred form, it is to be understood that other forms might be adopted, all coming within the scope of the claims which follow.

What is claimed is as follows:

1. In a rotatable regulator mechanism for a fluid circuit, a rotatable support plate, means for rotating the support, a governor valve unit mounted upon the rotatable support comprising in combination, a ported block having a bore communicating with the ports and arranged radially of the axis of plate rotation, a valve plunger with lands movable along the bore and adapted in a neutral position to substantially interrupt fluid flow through all of the ports and in an off-speed position to direct fluid flow through selected ports, a lever pivoted at one end to the valve plunger and extending substantially parallel with the axis of rotation, means at each end of the block spaced from and extending generally parallel with the lever, a compression spring supported by one of the extending means and engaging the lever at an intermediate point of its length, a carriage slidable on the other extending means and engaging the end of the lever remote from its pivotal connection to the valve plunger, said carriage acting as a fulcrum for the lever and being movable to and from the point of spring pressure for altering the leverage arm through which the spring acts upon the valve plunger.

2. In a governor valve unit, the combination comprising a rotatable support plate, means for rotating said support plate, a valve body providing a bore throughout its length mounted on and extending radially of the support plate, a valve plunger adapted to move lengthwise of the bore, means extending from the body at each end of the bore, a lever pivoted at one end to the valve plunger and extending from the body substantially parallel with the extending means and situated therebetween, a carriage slidable upon one of the extending means and adapted to support the remote end of the lever, and a spring supported by the other of the extending means, and disposed in parallelism with the valve plunger for pressing upon an intermediate portion of the lever, the arrangement being such that on rotation of the support plate the valve plunger will move in response to centrifugal force in opposition to spring pressure.

3. A governor mechanism for fluid circuits adapted to direct a source of fluid pressure to either one of a pair of control ports, said mechanism comprising in combination, a rotatable support plate, means for rotating said support plate, a valve body having a longitudinal bore mounted on and extending radially of the support plate and having a plurality of cross passages entering one face of the body to intersect said bore at spaced points along the length of the bore, an arm extending from the body normal to the bore thereof to provide a spring seat, a sleeve disposed in the bore of the block and having three sets of ports lineally spaced, each set of ports opening into the middle of the cross passages, a valve plunger responsive to centrifugal force for radial outward movement mounted in the sleeve and having an end pair of lands lineally spaced on either side of one set of sleeve ports to register each with a set of ports spaced from said middle set of ports, a lever pivoted at one end to said valve plunger, means providing a movable fulcrum for the opposite end of the lever, and yielding means extending parallel with the valve plunger from the said spring seat to engage the lever at an intermediate point to effect radial inward movement of said plunger, and means for moving the fulcrum along the lever past the said intermediate point for reversing the action of the yielding means in its biasing force upon the valve plunger.

4. The combination set forth in claim 3 wherein, the spring seat includes means for adjusting the normal working force of the yielding means.

5. In a regulator mechanism for a fluid circuit, a rotatable support providing fluid orifices, means for rotating the support, a governor valve unit adapted to be mounted upon the rotatable support comprising in combination, a valve body having a machined surface with recesses therein in registering and sealing engagement, each with an orifice of the support, said body having a passage therethrough communicating with all of said recesses, valving means located within the passage and comprising a porting sleeve and a pilot valve, said porting sleeve having sets of apertures therethrough opening into selected ones of the body recesses, said pilot valve having a pair of spaced lands each adapted to substantially cover selected ports of the sleeve when in a neutral position and thus control fluid flow to and from the body recesses, means extending in spaced relation from each end of the valve body, a carriage adapted to slide upon the extending means at one end of the body, a floating lever engaging the carriage as a fulcrum and pivotally connecting with the pilot valve, spring means engaging the lever at a point intermediate its length and supported by the other of said body extensions and means securing the valve unit upon the rotatable support with the pilot valve and passage extending radially of the support rotation, whereby the centrifugal force acting upon the pilot valve is in opposition to the said spring means.

JOHN F. HAINES.
THOMAS B. MARTIN.

REFERENCES CITED

The following references are of record in the file of this patent:

UNITED STATES PATENTS

| Number | Name | Date |
|---|---|---|
| 160,572 | Chase | March 9, 1875 |
| 2,307,102 | Blanchard et al. | Jan. 5, 1943 |
| 1,907,014 | Sperry | May 2, 1933 |
| 2,307,039 | Hammond | Jan. 5, 1943 |
| 2,263,449 | Adler | Nov. 18, 1941 |
| 2,276,717 | Codebecq | Mar. 17, 1942 |
| 2,241,475 | Olsson | May 15, 1941 |
| 1,585,529 | Boving | May 18, 1926 |
| 1,892,765 | Howard | Jan. 3, 1933 |
| 567,366 | Thunderbolt | Sept. 8, 1896 |
| 2,257,126 | Rindfleisch | Sept. 30, 1941 |
| 2,202,813 | Gausmann | June 4, 1940 |
| 2,057,088 | DeMillar | Oct. 13, 1936 |
| 2,214,119 | Brisbane | Sept. 10, 1940 |
| 2,013,647 | Bace | Sept. 10, 1935 |

FOREIGN PATENTS

| Number | Country | Date |
|---|---|---|
| 703,319 | Germany | Feb. 6, 1941 |
| 113,329 | Australia | July 3, 1941 |
| 480,747 | Great Britain | Feb. 25, 1938 |